United States Patent
Simonsson et al.

(10) Patent No.: US 11,363,600 B2
(45) Date of Patent: Jun. 14, 2022

(54) BEAM ASSIGNMENT IN A COMMUNICATIONS NETWORK

(71) Applicant: Telefonaktiebolaget LM Ericsson (publ), Stockholm (SE)

(72) Inventors: Arne Simonsson, Gammelstad (SE); Bo Goransson, Sollentuna (SE); Magnus Thurfjell, Lulea (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 114 days.

(21) Appl. No.: 16/644,494

(22) PCT Filed: Sep. 19, 2017

(86) PCT No.: PCT/SE2017/050913
§ 371 (c)(1),
(2) Date: Mar. 4, 2020

(87) PCT Pub. No.: WO2019/059820
PCT Pub. Date: Mar. 28, 2019

(65) Prior Publication Data
US 2020/0288452 A1    Sep. 10, 2020

(51) Int. Cl.
*H04W 72/04*    (2009.01)
*H04B 7/06*    (2006.01)

(52) U.S. Cl.
CPC ........ *H04W 72/046* (2013.01); *H04B 7/0617* (2013.01); *H04B 7/0695* (2013.01)

(58) Field of Classification Search
CPC .. H04W 72/046; H04W 72/04; H04B 7/0617; H04B 7/0695; H04B 7/0632; H04B 7/06; H04B 7/084; H04B 17/318
See application file for complete search history.

(56) References Cited

U.S. PATENT DOCUMENTS

2016/0066197 A1* 3/2016 Park ............... H04B 7/0695
                                                           370/329
2016/0329631 A1* 11/2016 Rheinfelder ..... H04L 43/106
(Continued)

FOREIGN PATENT DOCUMENTS

WO    2017045694 A1    3/2017

OTHER PUBLICATIONS

"Beamforming Gain Measured on a 5G Test-bed"; Simonsson et al.; 2017 IEEE 85th Vehicular Technology Conference (VTC Spring); Jun. 4-7, 2017 (Year: 2017).*

(Continued)

*Primary Examiner* — Benjamin H Elliott, IV
(74) *Attorney, Agent, or Firm* — Leffler Intellectual Property Law, PLLC

(57) ABSTRACT

There is provided mechanisms for assigning beams to terminal devices in a communications network. A method is performed by a network node. The method comprises determining an initial set of beams for serving the terminal devices, whereby each terminal device is assigned at least one of the beams. The method comprises obtaining an indication that further beams, in addition to those in the initial set of beams, are available for serving the terminal devices. The method comprises evaluating whether to expand the initial set of beams with the further beams or not, whereby the further beams are assigned to the terminal devices according to a criterion, until a resource utilization threshold is reached.

19 Claims, 4 Drawing Sheets

(56) References Cited

U.S. PATENT DOCUMENTS

| | | | | |
|---|---|---|---|---|
| 2018/0269958 A1* | 9/2018 | Garcia | ............... | H04B 7/18513 |
| 2018/0351624 A1* | 12/2018 | Hakola | ................ | H04B 7/0632 |
| 2018/0366815 A1* | 12/2018 | Rheinfelder | ............. | H01Q 3/34 |
| 2019/0014570 A1* | 1/2019 | Nam | ....................... | H04B 7/088 |
| 2019/0081673 A1* | 3/2019 | Athley | ................... | H04B 7/088 |
| 2020/0091608 A1* | 3/2020 | Alpman | ................... | H01Q 1/38 |
| 2020/0145079 A1* | 5/2020 | Marinier | .............. | H04B 7/0456 |
| 2020/0288452 A1* | 9/2020 | Simonsson | ......... | H04W 72/046 |

OTHER PUBLICATIONS

PCT International Search Report, dated May 30, 2018, in connection with International Application No. PCT/SE2017/050913, all pages.

PCT Written Opinion, dated May 30, 2018, in connection with International Application No. PCT/SE2017/050913, all pages.

\* cited by examiner

BEAM ASSIGNMENT IN A COMMUNICATIONS NETWORK

TECHNICAL FIELD

Embodiments presented herein relate to a method, a network node, a computer program, and a computer program product for assigning beams to terminal devices in a communications network.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

The terminal devices and/or the transmission and reception point (TRP) of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different terminal devices, different implementations will be needed.

The introduction of digital beamforming antenna systems in network nodes, such as radio base stations, etc., could allow multiple simultaneous narrow beams to be used to provide network access to, and thus serve, multiple simultaneous terminal devices, such as user equipment (UE), etc. Commonly, the functionality of the network node is split between a radio equipment controller (REC) and a radio equipment (RE) as interconnected for example by the Common Public Radio Interface (CPRI).

In view of the above, there are a number of resources that might be shared between terminal devices served by the network node. It could be challenging how to assign such resources to the terminal devices in an efficient manner.

SUMMARY

An object of embodiments herein is to provide efficient assignment of beams to terminal devices in a communications network.

According to a first aspect there is presented a method for assigning beams to terminal devices in a communications network. The method is performed by a network node. The method comprises determining an initial set of beams for serving the terminal devices, whereby each terminal device is assigned at least one of the beams. The method comprises obtaining an indication that further beams, in addition to those in the initial set of beams, are available for serving the terminal devices. The method comprises evaluating whether to expand the initial set of beams with the further beams or not, whereby the further beams are assigned to the terminal devices according to a criterion, until a resource utilization threshold is reached.

According to a second aspect there is presented a network node for assigning beams to terminal devices in a communications network. The network node comprises processing circuitry. The processing circuitry is configured to cause the network node to determine an initial set of beams for serving the terminal devices, whereby each terminal device is assigned at least one of the beams. The processing circuitry is configured to cause the network node to obtain an indication that further beams, in addition to those in the initial set of beams, are available for serving the terminal devices. The processing circuitry is configured to cause the network node to evaluate whether to expand the initial set of beams with the further beams or not, whereby the further beams are assigned to the terminal devices according to a criterion, until a resource utilization threshold is reached.

According to a third aspect there is presented a network node for assigning beams to terminal devices in a communications network. The network node comprises processing circuitry and a storage medium. The storage medium stores instructions that, when executed by the processing circuitry, cause the network node to perform operations, or steps. The operations, or steps, cause the network node to determine an initial set of beams for serving the terminal devices, whereby each terminal device is assigned at least one of the beams. The operations, or steps, cause the network node to obtain an indication that further beams, in addition to those in the initial set of beams, are available for serving the terminal devices. The operations, or steps, cause the network node to evaluate whether to expand the initial set of beams with the further beams or not, whereby the further beams are assigned to the terminal devices according to a criterion, until a resource utilization threshold is reached.

According to a fourth aspect there is presented a network node for assigning beams to terminal devices in a communications network. The network node comprises a determine module configured to determine an initial set of beams for serving the terminal devices, whereby each terminal device is assigned at least one of the beams. The network node comprises an obtain module configured to obtain an indication that further beams, in addition to those in the initial set of beams, are available for serving the terminal devices. The network node comprises an evaluate module configured to evaluate whether to expand the initial set of beams with the further beams or not, whereby the further beams are assigned to the terminal devices according to a criterion, until a resource utilization threshold is reached.

According to a fifth aspect there is presented a computer program for assigning beams to terminal devices in a communications network, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these network nodes, this computer program and this computer program product enable efficient assignment of beams to terminal devices in the communications network. In turn this enables efficient assignment of resources to the terminal devices.

For example, advantageously this method, these network nodes, this computer program and this computer program product enable the beams to be used where they are needed the most, improve the most, and or where there are largest gains.

For example, advantageously this method, these network nodes, this computer program and this computer program product enable efficient utilization of the interface between RECs and REs within the network node.

For example, advantageously this method, these network nodes, this computer program and this computer program product enable the user quality of service to be improved.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
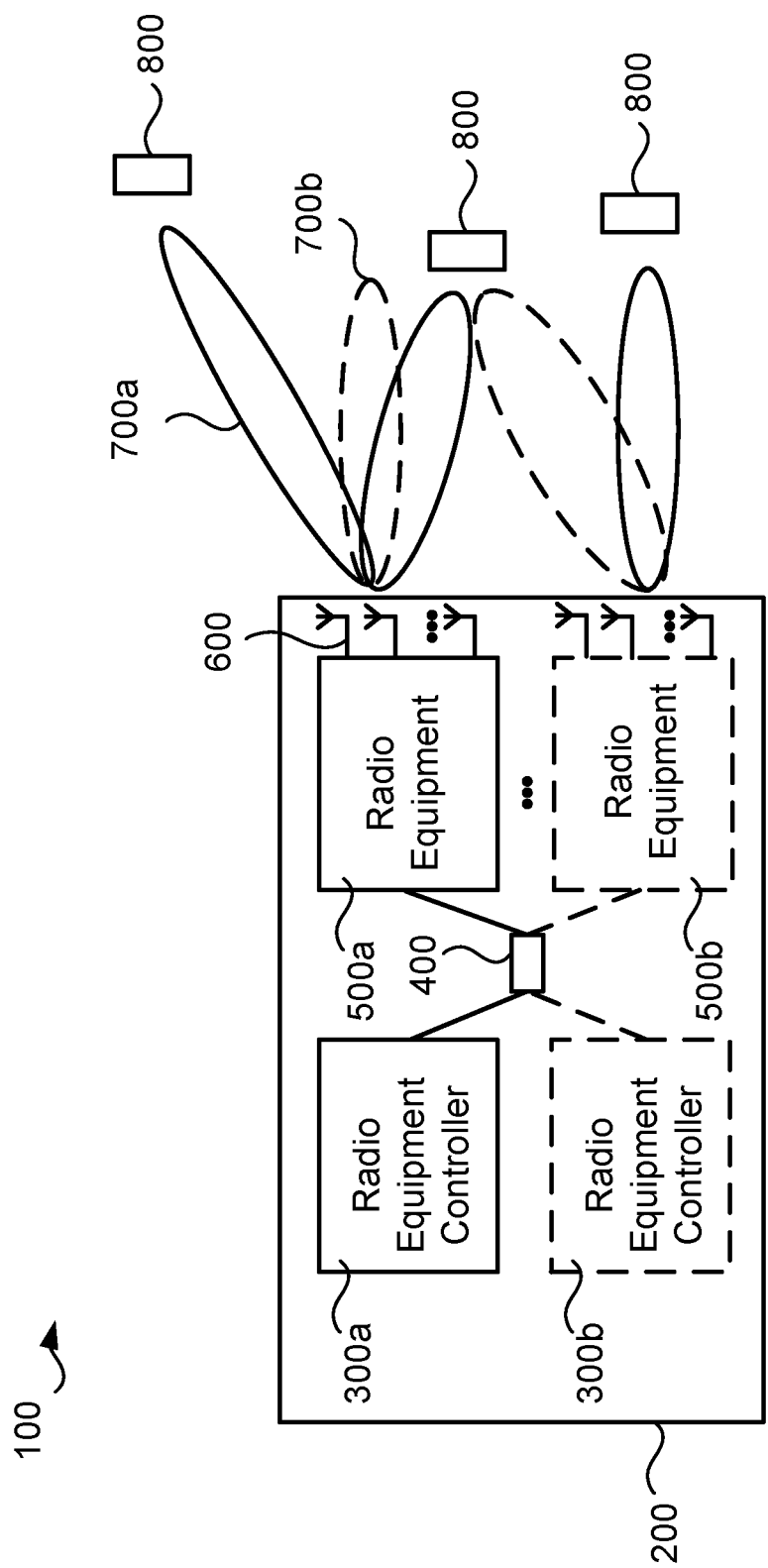
FIG. 1 is a schematic diagram illustrating a communications system according to embodiments.

FIG. 1 is a schematic diagram illustrating a communications system 100 where embodiments presented herein can be applied. The communications system 100 comprises a network node 200 and terminal devices 800. The network node 200 could be a radio base station such as a radio access network node, base transceiver station, node B, evolved node B, g node B, access point, or access node. The network node 200 comprises at least one Radio Equipment Controller (REC) 300a, 300b and at least one Radio Equipment (RE) 500a, 500b. In the illustrative example of FIG. 1 the network node 200 comprises two RECs and two REs, where each REC has an interface 400 to the REs; the interface 400 will hereinafter be denoted an transport interface 400. Preferably, the transport interface 400 is a wired interface, e.g. using optical fiber communications. However, alternatively the transport interface 400 is a wireless interface, e.g. using radio communications such as microwave link. The transport interface 400 could be implemented as a Common Public Radio Interface (CPRI) or any evolvement thereof.

The REs are configured to perform DL transmissions to, and UL receptions from, the terminal devices 800 in beams 700a, 700b by using appropriate beamforming weights at the antennas of the radio interface 600 at the REs. The beamforming weights define at least the pointing direction and the width of the beams. In some aspects the beams 700a, 700b are generated using analog-digital hybrid beamforming.

Figure 2:
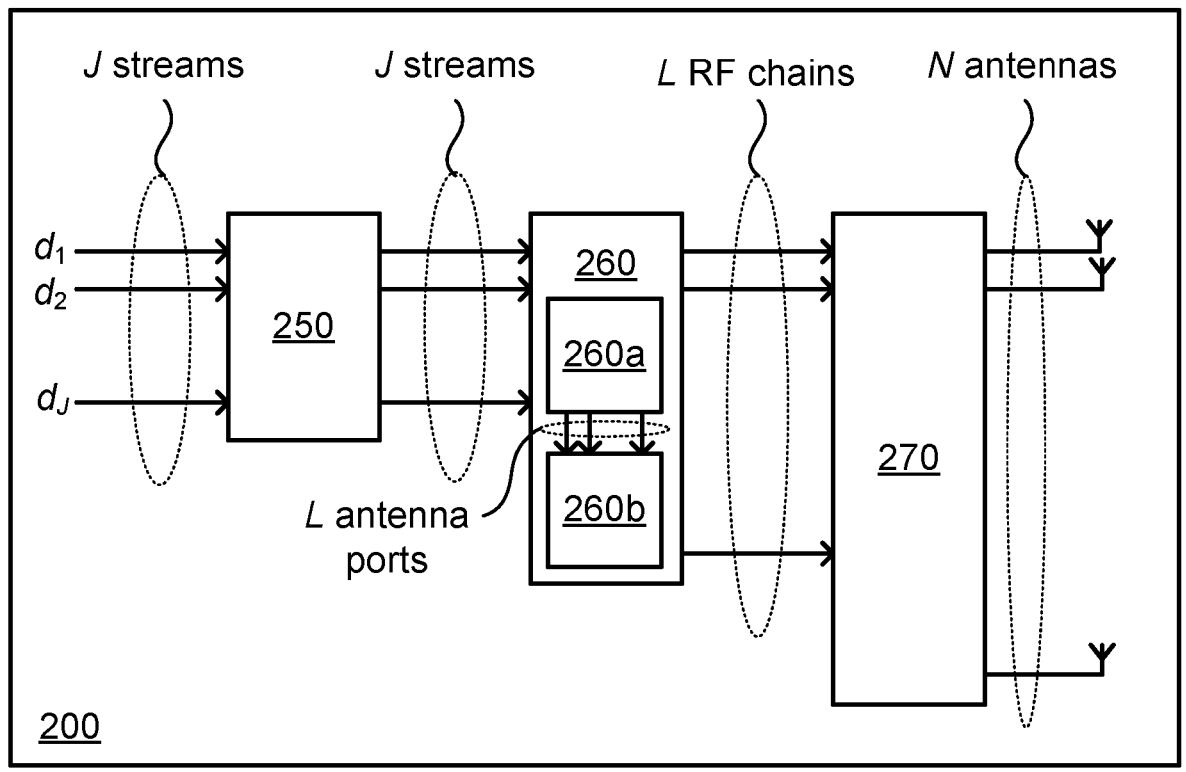
FIG. 2 schematically illustrates a network node according to an embodiment.

FIG. 2 schematically illustrates further aspects of signal processing in the network node 200. It is assumed for illustrative purposes that J streams $d_1, d_2, \ldots, d_J$ of information are to be transmitted by the network node 200. The information belongs to at least one of the terminal devices 800. The J streams of information are modulated into symbols in frequency domain in a modulation block 250 and fed to a digital precoder block 260. The J streams are in the digital precoder block 260 precoded (in sub-block 260a) to L antenna ports and are converted (in sub-block 260b) to time domain by an inverse discrete Fourier transform (IDFT). Each of the L antenna ports are fed into its own radio frequency (RF) chain. The L RF chains are fed into an antenna arrangement block 270 where beamforming weights are applied, so as to create analog beamforming, before the signal is transmitted in beams using N antenna elements. In general terms, $J \leq L < N$. In FIG. 2 the transport interface 400 might typically be the interface between blocks 250 and 260 or between blocks 260 and 270. The transport interface 400 might also be an internal interface in one of the blocks, such as within the digital precoder block 260 between precoding and IDFT, i.e., between sub-blocks 260a and 260b.

In view of the above there are some limited resources, such as the communications capacity of the transport interface 400, hardware limitations, the total number of beams in which signals can be communicated, and total transmission power, that might be shared between different served terminal devices 800. How to utilize these limited resources in an efficient manner and share these limited resources between different terminal devices 800 is challenging.

The embodiments disclosed herein relate to mechanisms for assigning beams to terminal devices 800 in a communications network 100. In order to obtain such mechanisms there is provided a network node 200, a method performed by the network node 200, a computer program product comprising code, for example in the form of a computer program, that when run on a network node 200, causes the network node 200 to perform the method.

Figure 3:
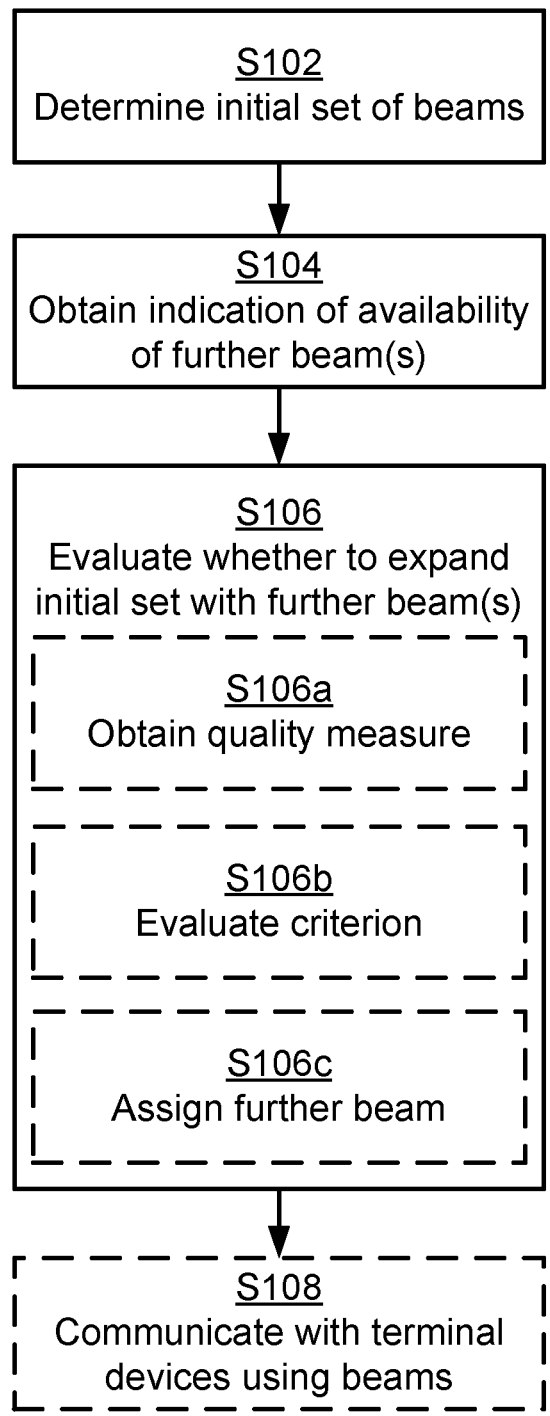
FIG. 3 is a flowchart of methods according to embodiments.

Reference is now made to FIG. 3 illustrating a method for assigning beams to terminal devices 800 in a communications network 100 as performed by the network node 200 according to an embodiment.

It is assumed that each served terminal device 800 is assigned at least one of the beams 700a in order for the network node 200 to be able to communicate with each served terminal device 800. Therefore the network node 200 is configured to perform step S102:

S102: The network node 200 determines an initial set of beams 700a for serving the terminal devices 800. Each terminal device 800 is assigned at least one of the beams. This enables all the terminal devices 800 to be served.

It is assumed that more than those beams 700a currently used for serving the terminal devices 800 are available. The network node 200 is therefore configured to perform step S104:

S104: The network node 200 obtains an indication that further beams 700b, in addition to those in the initial set of beams 700a, are available for serving the terminal devices 800.

New beams are then added until a resource utilization threshold is reached. The network node 200 is thus configured to perform step S106:

S106: The network node 200 evaluates whether to expand the initial set of beams 700a with the further beams 700b or not. The further beams 700b are assigned to the terminal devices 800 according to a criterion, until a resource utilization threshold is reached. Examples of criteria and resource utilization thresholds will be provided below.

Embodiments relating to further details of assigning beams to terminal devices 800 in a communications network 100 as performed by the network node 200 will now be disclosed.

There could be different examples of criteria according to which the further beams 700b are assigned to the terminal devices 800. Examples of criteria include, but are not limited to, where there are largest gains, where there is a need for largest improvement, and where the need is largest. Particularly, according to an embodiment the criterion is defined by for which terminal device 800 there is largest gain for having a further beam 700b assigned to it, for which terminal device 800 there is need for largest gain for having a further beam 700b assigned to it, and/or for which terminal device 800 there is largest need for having a further beam 700b assigned to it. Thereby, depending on which criterion or criteria is/are used, different further beams 700b might be assigned to different terminal devices 800.

There could be different examples of gain. Examples of gain include, but are not limited to, phase coherent transmission gain, per beam power optimized transmission gain, and expected remaining beamforming gain (based on achieved gain from analog beamforming). Thus, according to an embodiment the gain relates to phase coherent transmission gain, beam power gain, and/or beamforming gain. In further detail, the gain might be estimated as the potential gain from coherent transmission of a number of analog beams. This can consider phase coherent transmission only but might also include per beam power optimized transmission. It can also be the expected remaining beam forming gain based on achieved gain from analog beamforming.

In some aspects the terminal devices 800 report the signal strength measured on reference signals (as transmitted by the network node 200) back to the network node 200. Reports of signal strengths can be used by the network node 200 to estimate the gain, denoted $gain_{ph}$, for coherent phase transmission of using further beams compared to only transmitting with a single, current, strongest beam according to Equation (1):

$$gain_{ph} = \frac{\left(\sum_{bix=mbix_{1:N}} \sqrt{brsrp_{bix}}\right)^2 / K}{\max_{bix}(brsrp_{bix})} \quad (1)$$

In Equation (1), $\Sigma$ represents the summation operator, the parameter $brsrp_{bix}$ is the signal strength of the reference signals in linear scale for beam with index bix, and K is the number of coherent used beams mbix. mbix is typically selected as the strongest beams but can be any other selection. The beam index $bix=mbix_{1:K}$ represents the summation index and runs from beam $mbix_1$ to beam $mbix_K$.

In general terms, in Equation (1) the coherency gain is compared relative to the strongest beam. Equal transmitted power on all beams is assumed. Due to coherent phase, the amplitudes are summed in the numerator and then squared to get the received power. This operation is followed by a division by the number of combined beams K to preserve the transmitted power to the user with equal transmit power on all beams. The denominator represents the received power using only the strongest beam.

In case unequal transmission power on the beams is supported, a power optimized beam transmission gain, denoted $gain_{opt}$, can be estimated according to Equation 2:

$$gain_{opt} = \frac{\left(\sum_{bix=mbix_{1:K}} brsrp_{bix}\right)^2}{\max_{bix}(brsrp_{bix}) \cdot \sum_{bjx=mbix_{1:K}} brsrp_{bjx}} \quad (2)$$

Equation (2) is similar to Equation (1), but instead of weighting the power equally using 1/K:th of the power on each beam, the transmit power is in Equation (2) weighted proportionally to the brsrp level of each beam.

A loss factor could be added to any of Equations (1) and (2), the loss factor taking into account any known non-optimal contributions in the coherent beamforming, such as quantization, measurement inaccuracy and/or delay.

There could be different ways to determine to which wireless device(s) 800 to allocate the further beam(s). In general terms, the gain from additional beam(s) is estimated based on per beam measure for each terminal device, whereby the coherent gain from additional beams is estimated based on per beam measured signal strength or pathloss. Particularly, according to an embodiment the network node 200 is configured to perform steps S106a, S106b, S106c as part of assigning the further beams 700b to the terminal devices 800 in step S106.

First, the network node 200 estimates signal quality per beam per terminal device, as in step S106a:

S106a: The network node 200 obtains a quality measure per beam per terminal device 800 at least for a further beam 700b by which the initial set of beams 700a is to be expanded.

The quality measure could be obtained in terms of path loss estimates per beam per terminal device, in terms of uplink signal strength measurement (such as measurements made by the network node 200 on sounding reference signals (SRS) transmitted by the terminal devices), or as reports (such as channel state information reference signal (CSI-RS) reports from the terminal devices.

Second, the network node 200 estimates the gain for each added new beam per terminal using the information obtained in step S106*a*, as in step S106*b*:

S106*b*: The network node 200 evaluates the criterion for assigning one of the further beams 700*b* to any of the terminal devices 800 according to the obtained quality measures.

Quality of service and fairness might also be taken into account when estimating the gain for each added new beam in step S106*b*. Then, a weighting of a fairness factor and/or a quality of service requirement together with the gain could be part of evaluating the criterion for assigning one of the further beams 700*b*.

The fairness factor might be based on a radio quality measure, such as signal strength or signal to interference plus noise ratio (SINR) targeting radio link fairness between terminal devices and assigning beams to terminal devices experiencing comparatively bad radio conditions, even though the gain is smaller. Quality of service (and also fairness) could be based on achieved throughput or used transport format (such as used modulation and coding scheme (MCS) and rank). At least one further beams can be assigned to terminal devices that will meet the quality of service requirements with the estimated additional gain rather than to a terminal device which will achieve largest additional gain.

Third, the beams are added to the terminal devices according to the criterion and based on the information obtained in step S106*b*, as in step S106*c*:

S106*c*: The network node 200 assigns the-so-called one further beam 700*b* to the terminal device 800 for which the criterion is fulfilled.

Steps S106*a*-S106*c* might be repeated, thus adding beams one by one in order of the gain they add to each terminal device, until the resource utilization threshold is reached.

According to an embodiment the quality measure per beam per terminal device 800 further is obtained for the beams in the initial set of beams 700*a*.

As noted above, there could be different examples of resources to which the resource utilization threshold pertains.

The resource limitation could be the communications capacity of the transport interface 400. It could also be hardware limitation in the network node 200 and/or the terminal devices 800, such as the number of beams in which signals can be communicated, or the total transmission power. Transmission power limitation could be for the network node 200 as a whole or for individual power amplifiers. There might also be a limitation in memory write-read for communications between different units within the network node 200. Particularly, according to an embodiment the resource utilization threshold pertains to usage of the transport interface 400 of the network node 200, hardware resources of the network node 200 and/or the terminal devices 800, transmission power of the network node 200 and/or the terminal devices 800, and/or the total number of beams 700*a*, 700*b* used by the network node 200.

The load on the transport interface 400 might depends on the number of terminal devices 800, the number of beams used, the number of radio frequency chains, the number of baseband chains, the scheduled frequency bandwidth, and the used coding and modulation scheme. Particularly, according to an embodiment the usage of the transport interface 400 relates to downlink communications and/or uplink communications between the network node 200 and the terminal devices 800.

As noted above, the network node 200 might comprises at least two RECs 300*a*, 300*b* and at least two REs 500*a*, 500*b*. Therefore, the transport interface 400 might be shared between at least two RECs 300*a*, 300*b* and at least two REs 500*a*, 500*b*. That is, according to an embodiment the transport interface is shared between at least two radio equipment 500*a*, 500*b* and/or between at least two radio equipment controllers 300*a*, 300*b*. When at least two RECs 300*a*, 300*b* and/or at least two REs 500*a*, 500*b* share the same transport interface 400 the herein disclosed methods could be applied to the total load on the transport interface 400, finding the combined best beam allocation for all of the at least two RECs 300*a*, 300*b* and/or at least two REs 500*a*, 500*b*. Further, the load on the transport interface 400 might be different between uplink and downlink. The assignment of further beams 700*b* might be stopped when either one of the uplink capacity and the downlink capacity of the transport interface 400 reaches the resource utilization threshold.

There could be different examples of the resource utilization threshold. According to an embodiment the resource utilization threshold is 75% of full resource utilization, preferably 90% of full resource utilization, and most preferably 100% of full resource utilization.

Any of the afore-disclosed steps S102-S106*c* could be performed according to a repetition interval. There could be different ways to determine the repetition interval. Particularly, according to an embodiment the evaluating (as in S106) is performed per scheduling instant of the terminal devices 800, and/or upon reception of measurement reports from the terminal devices 800. In more detail, all steps S102-S106 might in principle be repeated every subframe but these steps might also be repeated less frequently as a whole or partly. Typically, step S106*a* (and possibly step S106*b*) might be performed less frequently than step S106*c*, such as only when measurements and reports becomes available. The availability of measurements and reports might be event driven, dependent on changes and thresholds.

Once the beams have been assigned the network node 200 could use the assigned beams for communication with the terminal devices 800. Hence, according to an embodiment the network node 200 is configured to perform (optional) step S108:

S108: The network node 200 communicates with the terminal devices 800 in the beams assigned to the terminal devices 800.

According to an embodiment the communicating in step S108 involves the network node 200 to transmit signals to the terminal device 800 in the beams assigned to the terminal device 800.

According to an embodiment, phase coherent communication is used for at least two beams for those terminal devices 800 having at least two beams assigned.

Figure 4:
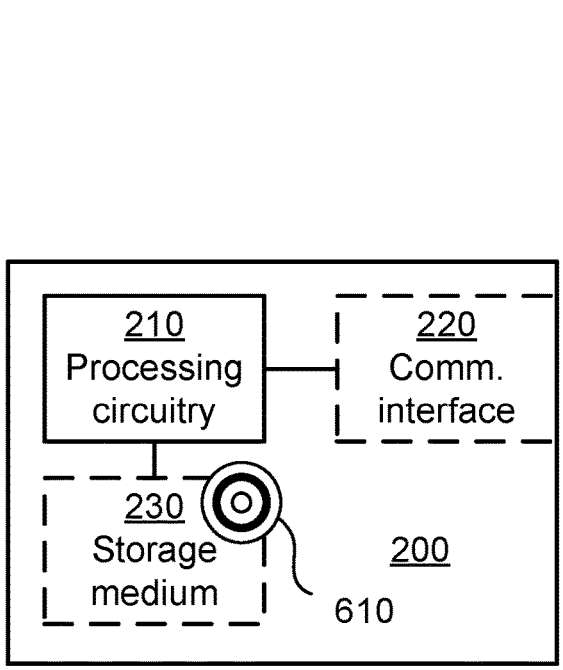
FIG. 4 is a schematic diagram showing functional units of a network node according to an embodiment.

FIG. 4 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S108, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with the terminal devices 800. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 5:
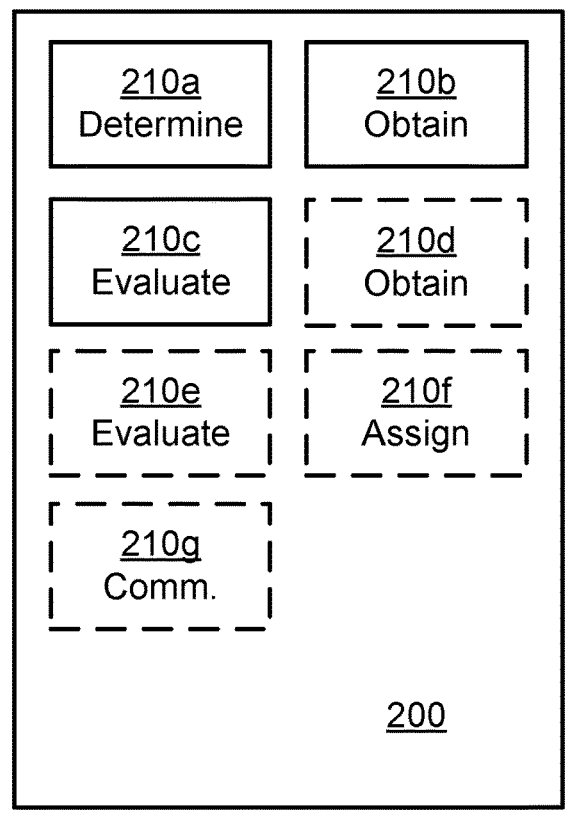
FIG. 5 is a schematic diagram showing functional modules of a network node according to an embodiment.

FIG. 5 schematically illustrates, in terms of a number of functional modules, the components of a network node 200 according to an embodiment. The network node 200 of FIG. 5 comprises a number of functional modules; a determine module 210a configured to perform step S102, an obtain module 210b configured to perform step S1o4, and an evaluate module 210c configured to perform step S106. The network node 200 of FIG. 5 may further comprise a number of optional functional modules, such as any of an obtain module 210d configured to perform step S106a, an evaluate module 210e configured to perform step S106b, an assign module 210f configured to perform step S106c, and a communications module 210g configured to perform step S108. In general terms, each functional module 210a-210g may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module 210a-210g and to execute these instructions, thereby performing any steps as disclosed herein.

The network node 200 may be provided as a standalone device or as a part of at least one further device. For example, the network node 200 may be provided in a node of a radio access network or in a node of a core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell served by the network node 200 than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 4 the processing circuitry 210 may be distributed among a plurality of devices, or nodes. The same applies to the functional modules 210a-210g of FIG. 5 and the computer program 620 of FIG. 6.

Figure 6:
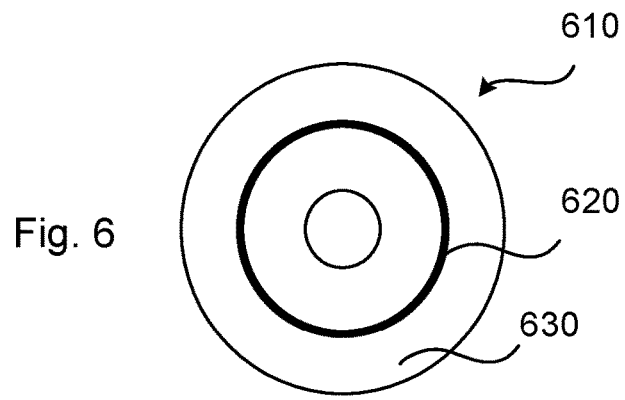
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for assigning beams to terminal devices in a communications network that comprises a radio access network and a core network, wherein the radio access network comprises one or more radio access network nodes, and the core network comprises one or more core network nodes, and wherein the communications network serves the terminal devices, the method comprising:
  a network node performing:
    determining an initial set of beams for serving the terminal devices, whereby each terminal device is assigned at least one of the beams;

obtaining an indication that further beams, in addition to those in the initial set of beams, are available for serving the terminal devices;

obtaining a quality measure for one or more of the further beams from a plurality of the terminal devices; and evaluating whether to expand the initial set of beams with the further beams or not, whereby the further beams are assigned to the plurality of terminal devices according to a criterion for assigning one of the further beams to any of the terminal devices according to the obtained quality measure, until a resource utilization threshold is reached, wherein the resource utilization threshold pertains to a communications capacity of a transport interface, a hardware limitation in the network node, and/or a hardware limitation in the terminal devices, wherein the network node is one or more of: one of the radio access network nodes and one of the core network nodes.

2. The method according to claim 1, further comprising: communicating with the terminal devices in the beams assigned to the terminal devices.

3. The method according to claim 2, wherein said communicating involves the network node to transmit signals to the terminal device in the beams assigned to the terminal device.

4. The method according to claim 2, wherein for those terminal devices having at least two beams assigned, phase coherent communication is used for said at least two beams.

5. The method according to claim 1, wherein the criterion is defined by at least one of: for which terminal device there is largest gain for having a further beam assigned to it, for which terminal device there is need for largest gain for having a further beam assigned to it, and for which terminal device there is largest need for having a further beam assigned to it.

6. The method according to claim 5, wherein said gain relates to at least one of phase coherent transmission gain, beam power gain, and beamforming gain.

7. The method according to claim 1, wherein the quality measure per beam per terminal device further is obtained for the beams in the initial set of beams.

8. The method according to claim 1, wherein the resource utilization threshold pertains to at least one of: usage of an external transport interface of the network node, hardware resources of the network node and/or the terminal devices, transmission power of the network node and/or the terminal devices, and total number of beams used by the network node.

9. The method according to claim 8, wherein the usage of the external transport interface relates to at least one of: downlink communications and uplink communications between the network node and the terminal devices.

10. The method according to claim 8, wherein the transport interface is shared between at least two radio equipment and/or between at least two radio equipment controllers.

11. The method according to claim 1, wherein the resource utilization threshold is at least 75% of full resource utilization.

12. The method according to claim 1, wherein the evaluating is performed per scheduling instant of the terminal devices and/or upon reception of measurement reports from the terminal devices.

13. The method according to claim 1, wherein the beams are generated using analog-digital hybrid beamforming.

14. The method of claim 1, wherein the evaluating is based on at least one of: an estimated gain for coherent phase transmission of using further beams compared to only transmitting with a single current strongest beam, an estimated gain considering unequal transmission power on the beams, an estimated gain considering a weighting of a fairness factor and a quality of service requirement for assigning one of the further beams.

15. The method of claim 1, wherein the transport interface is a Common Public Radio Interface (CPRI).

16. A network node for assigning beams to terminal devices in a communications network that comprises a radio access network and a core network, wherein the radio access network comprises one or more radio access network nodes, and the core network comprises one or more core network nodes, and wherein the communications network serves the terminal devices, the network node comprising processing circuitry, the processing circuitry being configured to cause the network node to perform:

determining an initial set of beams for serving the terminal devices, whereby each terminal device is assigned at least one of the beams;

obtaining an indication that further beams, in addition to those in the initial set of beams, are available for serving the terminal devices;

obtaining a quality measure for one or more of the further beams from a plurality of the terminal devices; and evaluating whether to expand the initial set of beams with the further beams or not, whereby the further beams are assigned to the plurality of terminal devices according to a criterion for assigning one of the further beams to any of the terminal devices according to the obtained quality measure, until a resource utilization threshold is reached, wherein the resource utilization threshold pertains to a communications capacity of a transport interface, a hardware limitation in the network node, and/or a hardware limitation in the terminal devices, wherein the network node is one or more of: one of the radio access network nodes and one of the core network nodes.

17. The network node according to claim 16, wherein:
the processing circuitry is programmable; and
the network node further comprises:
a non-transitory computer readable storage medium storing instructions that, when executed by the processing circuitry, cause the network node to perform:
the determining, the obtaining, and the evaluating.

18. A network node for assigning beams to terminal devices in a communications network that comprises a radio access network and a core network, wherein the radio access network comprises one or more radio access network nodes, and the core network comprises one or more core network nodes, and wherein the communications network serves the terminal devices, the network node comprising:

determining circuitry configured to determine an initial set of beams for serving the terminal devices, whereby each terminal device is assigned at least one of the beams;

obtaining circuitry configured to obtain an indication that further beams, in addition to those in the initial set of beams, are available for serving the terminal devices;

obtaining a quality measure for one or more of the further beams from a plurality of the terminal devices; and evaluating circuitry configured to evaluate whether to expand the initial set of beams with the further beams or not, whereby the further beams are assigned to the plurality of terminal devices according to a criterion for assigning one of the further beams to any of the terminal devices according to the obtained quality measure, until a resource utilization threshold is reached, wherein the resource utilization threshold pertains to a communications capacity of a transport interface, a hardware limitation in the network node, and/or a hardware limitation in the terminal devices, wherein the network node is one or more of: one of the radio access network nodes and one of the core network nodes.

19. A non-transitory computer readable storage medium comprising a computer program for assigning beams to terminal devices in a communications network that comprises a radio access network and a core network, wherein the radio access network comprises one or more radio access network nodes, and the core network comprises one or more core network nodes, and wherein the communications network serves the terminal devices, the computer program comprising computer code which, when run on processing circuitry of a network node, causes the network node to:

determine an initial set of beams for serving the terminal devices, whereby each terminal device is assigned at least one of the beams;

obtain an indication that further beams, in addition to those in the initial set of beams, are available for serving the terminal devices;

obtain a quality measure for one or more of the further beams from a plurality of the terminal devices; and evaluate whether to expand the initial set of beams with the further beams or not, whereby the further beams are assigned to the terminal devices according to a criterion for assigning one of the further beams to any of the terminal devices according to the obtained quality measure, until a resource utilization threshold is reached, wherein the resource utilization threshold pertains to a communications capacity of a transport interface, a hardware limitation in the network node, and/or a hardware limitation in the terminal devices, wherein the network node is one or more of: one of the radio access network nodes and one of the core network nodes.

* * * * *